LEE M. GRISWOLD
JAMES F. SHIELLS, JR.
THOMAS G. UTER
INVENTORS.

BY
Lyon & Lyon
ATTORNEYS.

United States Patent Office 3,348,017
Patented Oct. 17, 1967

3,348,017
WELDING CONTROL SYSTEM
Lee M. Griswold, Pasadena, James F. Shiells, Jr., La Canada, and Thomas G. Uter, Alhambra, Calif., assignors to Digital Sensors Inc., Los Angeles, Calif., a corporation of California
Filed May 22, 1963, Ser. No. 282,355
12 Claims. (Cl. 219—109)

The present invention relates to means and techniques for improving the quality and reliability of welds, particularly those made by, but not necessarily limited to those made by, capacitance discharge and other short time cycle welders.

In, for example, the process of electric resistance welding, metals are joined or fused together as a result of intense localized heat derived from electricity. Current flows across the contacting surfaces and through the weldments (parts to be welded). The heat created by this current flow causes the contacting metal surfaces to melt. Upon the application of pressure, molten surfaces of the parts fuse and cool as a single unit. Under ideal conditions it is possible to make a great number of welds with a given set-up and achieve substantially identical results. Under less favorable conditions it has been found that an intolerable failure rate occurs despite careful workmanship and inspection.

In making spot welds, there is sometimes a problem of high resistance contact between the weldments or between the weldments and the electrode surfaces. The high resistance surfaces are commonly caused by metal oxides, dirt, dust, grease, insulation, surface finish, etc. When this occurs the welding current does not duplicate the set-up conditions and a defective weld results, i.e., current flow is reduced and the current at the high resistance contact overheats one localized area and does not properly melt the rest of the surfaces that should be fused. Any increase in contact resistance reduces the overall heat of energy that is available to cause melting and subsequent fusion. It usually always results in a subnormal weld. It is difficult to examine the finished weld and prove that the weld is not defective without testing. In the extreme case, an arc results which rapidly erodes the high resistance surfaces causing what is commonly known as a "blow-up." A "blow-up" usually damages the weldments and/or the electrodes so that the parts must be replaced and/or the original set-up restored.

In order to insure a high quality weld and also avoid the "blow-up" damage, it is desirable to determine in advance whether or not conditions exist that are identical to those that existed when acceptable welds were made.

The high resistance or poor contact resistance mentioned above is in the order of micro ohms or milliohms and is not easily detected with ordinary equipment. The present method and apparatus are capable of measuring in such low resistance ranges as to detect oxided surfaces, the presence of contaminants and even the surface contact area variations resulting from variations in electrode pressure.

To measure these conditions, a high current at a low voltage is passed between the electrodes and through the weldments. The voltage drop between the electrodes is read to determine the resistance of the combined surfaces between the electrodes and the weldments and between the weldments themselves. The voltage applied is an alternating current to prevent polarization, and of a low enough voltage to not cause any damage to the regular welding current supply or the weldments. The voltage between electrodes is amplified and presented on an oscilloscope screen. When the electrodes are not in contact, the amplifier and oscilloscope accept the full applied sensing voltage. With the electrodes closed on the weldments, the oscilloscope amplifies the very small voltage drop at the electrode surface and the weldments interface; thus changes in contact resistance can be observed on the oscilloscope screen. The oscilloscope presentation is in view of the operator so that prior to triggering the welding current for each weld, the operator can determine that the contact resistance is substantially identical to those of the set-up welds that were tested and proven to be good. When the oscilloscope presentation or display indicates that the contact resistance is normal, the sensing circuit is disconnected from the electrodes in order that the welding current not be discharged and dissipated into the sensing circuit. Means is provided for doing this. The system also includes circuitry which prevents premature triggering of the welding current prior to proper conditions being met. It is desirable to limit welding to those times when correct welding parameters exist.

In general, the system disclosed may be divided into two sections: (1) the safety control circuit and (2) the sensing circuit. The safety control circuit prevents premature firing of the welding power supply. The sensing circuit gives the operator a visual presentation of the electrical contact resistance conditions at the weld junction both prior to and after a welding operation.

It is therefore a general object of the present invention to provide a system having the features indicated above.

A specific object of the present invention is to provide a system of this character in which the resistance is effectively measured and the welding current subsequently applied in an orderly fool-proof manner.

Another specific object of the present invention is to provide a system of this character in which the measuring and welding circuitry are interlocked so that the same is rendered alternatively effective without damage to equipment resulting from incorrect procedural steps.

Another specific object of the present invention is to provide an improved method for improving welding operations.

Another specific object of the present invention is to provide a system of this character sensitive to proper pressure conditions for initiating a welding operation and disabling a sensing circuit which is normally effective both prior to and after a welding operation to indicate effectively the resistance between welding electrodes.

Another specific object of the present invention is to provide a system of this character requiring a particular safe sequence of operation prior to application of welding current between those electrodes across which normally an electrical resistance indicating circuit is connected.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
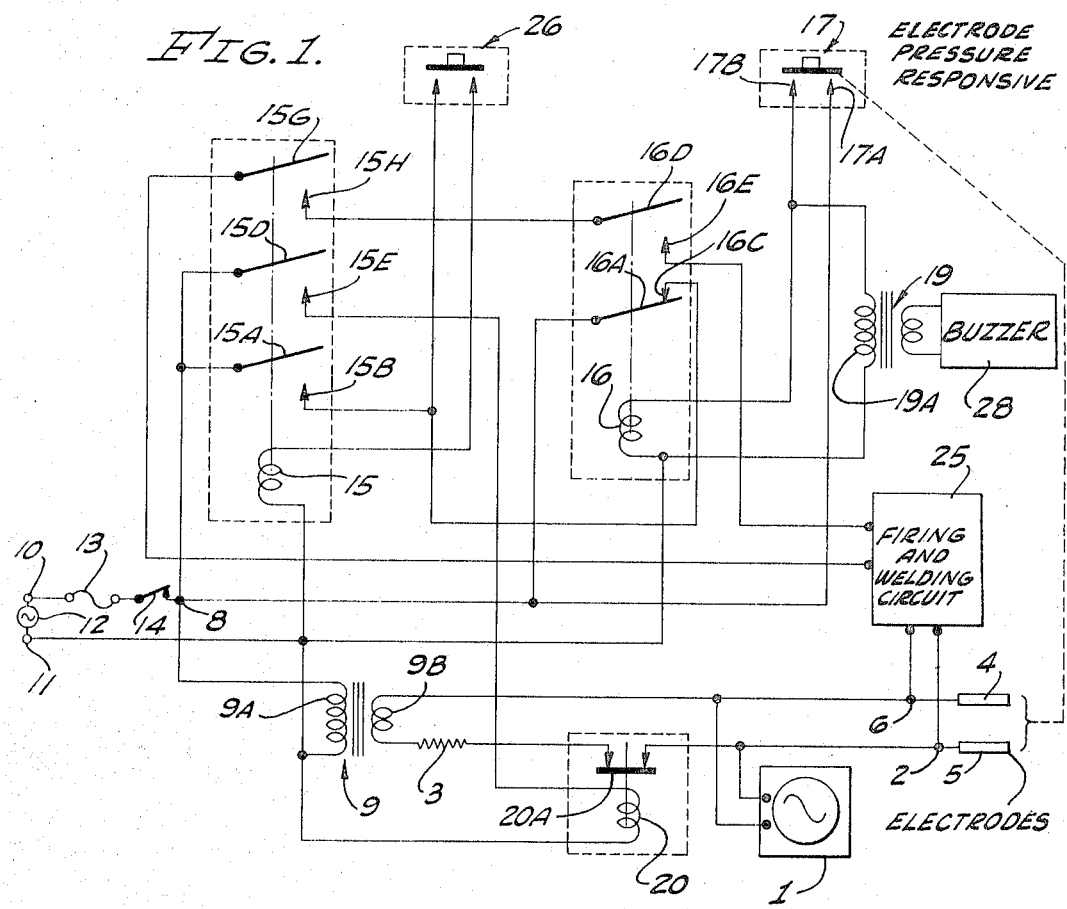
FIGURE 1 illustrates in schematic form a system embodying features of the present invention.

The system illustrated in FIGURE 1 includes a pair of AC terminals 10, 11 to which a 115 volt AC source 12 is connected. Terminal 10 is connected to terminal 8 through a fuse 13 and On-Off switch 14.

Figure 2:
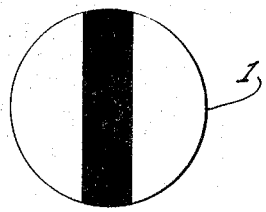
FIGURES 2–6 illustrates various displays obtainable on the oscilloscope incorporated in the system shown in FIGURE 1.

Connected across terminals 8 and 11 is a checking circuit which includes the primary winding 9A of a transformer 9 having one terminal of its secondary winding 9B connected to a terminal 6 connected to a welding electrode 4, the other terminal of winding 9B being connected through a current limiting resistance 3 and normally closed relay switch 20A to terminal 2 for the other welding electrode 5, and a cathode ray tube oscilloscope 1 has its vertical deflection terminals connected across terminals 6 and 2 for purposes of indicating or checking the voltage between electrodes 4 and 5. When the electrodes are in the open position, full voltage from the secondary winding appears across electrodes 4, 5 and this condition is displayed on the oscilloscope 1 as illustrated in FIGURE 2, a condition where the vertical trace of the cathode beam occupies the full height of the display and indeed a part of the trace is driven beyond the face of the oscilloscope.

This checking or sensing circuit is deenergized during the actual welding as described later by energizing the relay coil 20 to open the associated relay switch 20A. Transformer 9 is an AC source of low potential of approximately 2.5 volts capable of delivering high current in the order of 10 amperes, not for welding purposes however but for checking resistances between welding electrodes. This current from this source 9 creates a sufficient voltage drop across the weld junction due to the resistance between the weldments and between the weldments and the electrodes, to be measured or indicated by the oscilloscope 1. Because of the high current flow, small changes in junction resistance will show up as changes in the voltage drop as measured by the oscilloscope to produce a condition as illustrated in FIGURE 3 wherein direct contact between electrodes produces a highly conductive junction creating a minimum voltage drop as measured by the oscilloscope and with a rectangular shape as shown with the width being greater than the height.

Figure 3:
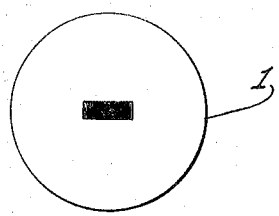
Figure 4:
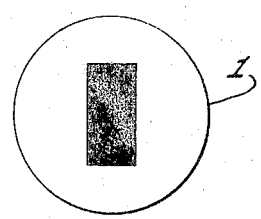

FIGURE 3 is to be compared with FIGURE 4 which shows the result of a high resistance junction that causes a decrease in sensing current and an increase in voltage drop at the electrodes, again the display being rectangular and with the height being greater than the width. The oscilloscope is preadjusted for a particular horizontal deflection, using conventional means associated with a conventional oscilloscope such that any increase in height over and above that necessary for a square presentation or display serves as an indication of high resistance at the weld junction and a caution that welding must not be attempted until the abnormal condition is corrected; otherwise an attempt to produce a satisfactory weld results in a substandard weld and in extreme cases a "blow-up."

Figure 5:
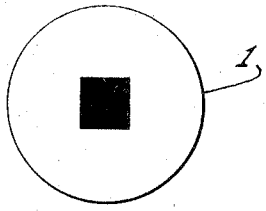

FIGURE 5 illustrates an optimum condition wherein the oscilloscope display is square. Preferably, the horizontal gain control of the oscilloscope is adjusted for each set-up so that this square pattern exists at optimum welding conditions. Welding is accomplished only after this square pattern is observed at normal welding pressure since pressure has some effect on the pattern or display.

Figure 6:
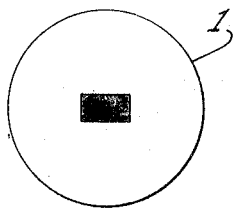

FIGURE 6 is an illustration of the pattern after welding has been satisfactorily completed where in this case the rectangular pattern has a width greater than the height and serves as an electrical check of the weld junction capable of detecting defective welds.

The system thus contemplates what is essentially an electrical resistance check both prior to and after the welding operation with interlocked electrical circuitry now described which automatically and safely removes this checking circuit from the electrodes during the actual welding operation by opening of relay switch 20A.

Actual welding is accomplished by closing a series circuit to the firing and welding circuit 25 having its output terminals connected, respectively, to electrode terminals 2, 6 and its input circuit connected in a series circuit with the two normally open relay switches 15G, 15H and 16D, 16E. This circuit is closed only when associated relay coils 15 and 16 are simultaneously closed to move the movable relay switch arms 15G and 16D into engagement with their associated corresponding stationary contacts 15H and 16E, in which case welding current may flow to and between electrodes 4, 5.

One condition for establishing this above mentioned series circuit is that proper welding pressure be present between electrodes 4, 5, and this condition is sensed by a pressure responsive switch 17 which is connected in series with relay coil 16 and senses the pressure or force exerted between electrodes 4 and 5; such switch 17 closes only when a preset welding electrode pressure is reached. The switch 26 is a manually operated switch in series with relay coil 15 and is operated to closed position when a welding operation is to be performed.

It will be seen that coil 16 has one of its terminals connected to terminal 11 and its other terminal connected through the switch 17 to terminal 8; and connected in parallel with coil 16 is the primary winding 19A of transformer 19 having its secondary winding connected in series with a buzzer 28 or other signalling device for purposes described later.

The relay coil 15 has one of its terminals connected to terminal 11 and the other one of its terminals connected through the manually operable switch 26 to each of stationary relay contacts 15B and 16C which are connectible through their corresponding relay switch arms 15A and 16A to terminal 8, the relay switch 15A, 15B being normally open and the relay switch 16A, 16C in parallel therewith being normally closed.

The other or third relay coil 20 has one of its terminals connected to terminal 11 and the other one of its terminals connected through relay switch 15D, 15E to terminal 8.

A series of steps are contemplated in operation of the system. The first step involves an ascertainment of resistance prior to welding and under the condition where the preset welding pressure is present. Thus, in accomplishing this first step, the electrodes are mounted against the weldments, and when the preset pressure or force is attained, the pressure responsive switch 17 is closed to thereby energize the buzzer 28 to produce an audible signal of this condition; and also closure of switch 17 results in energizing coil 16 to thereby open the normally closed relay switch 16A, 16C to prevent energization of coil 15 should the manually operable switch 26 be inadvertently closed, i.e., a safety circuit is provided preventing the premature firing of the welding power supply 25. With coil 16 and buzzer 28 thus energized, the operator observes the display on oscilloscope 1 and observes whether or not such display meets those standards described above in connection with FIGURE 5 and, if so, he proceeds with the next step and this involves the initial step of removing the electrode pressure to allow switch 17 to reopen, in which case at less than welding pressure switch 17 is open and relay coil 16 and buzzer 28 are deenergized and relay switch 16A, 16C assumes its normally closed position to condition an energizing circuit for coil 15, such energizing circuit being then closed by manually operating switch 26 to closed position to fully energize coil 15 and cause each of its three normally open relay switches 15A, 15B; 15D, 15E and 15G, 15H to close. Such closure of switch 15A, 15B assures or maintains the energization of coil 15 (assuming switch 26 is maintained manually closed) regardless of the condition of relay switch 16A, 16C.

Such closure of switch 15D, 15E results in energization of relay coil 20 and consequent opening of the normally closed switch 20A to thereby isolate the transformer 9 in the previously mentioned checking circuit.

Such closure of switch 15G, 15H conditions, the control circuit for the welding power supply 25, and such control circuit is then subsequently completely closed when the operator applies the above mentioned preset pressure between electrodes 4, 5 causing the pressure responsive switch 17 to close to thereby energize coil 16 with resulting closure of switch 16D and 16E and discharge of a welding current from supply 25 to the electrodes 4, 5.

After this welding operation, the operator releases switch 26 in which case the coil 15 is deenergized and switches 15A, 15B; 15D, 15E and 15G, 15H each assume its normally open position. The relay coil 20 is now deenergized causing its switch 20A to close to thereby reestablish the checking or monitoring circuit in which case the operator now has a visual display on oscilloscope 1 which indicates the character of the weld as described above in connection with FIGURE 6.

The oscilloscope provides a measurement or indication of the potential and consequently a visual presentation or display of the junction resistance. The potential at the electrodes is amplified by conventional adjustable amplifying means in the oscilloscope and applied to the vertical beam deflection means while the horizontal deflection circuit sweeps at a rate of approximately 10,000 cycles per second. The horizontal sensitivity of the oscilloscope may be adjusted by conventional means incorporated in the same to limit the width of the vertical deflection, thus displaying the sensed voltage as a column of lighted area of constant width. The vertical deflection circuit may be coupled to the electrodes as shown or be coupled to the power side of switch 20A so as to be rendered ineffective when switch 20A is opened.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a welding system of the character described, welding electrodes, first means for indicating electrical resistance between said electrodes, signalling means responsive to pressure between said electrodes for developing a signal, said signalling means incorporating a pressure responsive element, second means for applying a welding current between said electrodes and for disabling said first means, said second means incorporating said pressure responsive means and a manually operable element normally effective when operated to render said second means effective to supply welding current to said electrodes and to disable said first means, and means operated in response to actuation of said pressure responsive element for preventing operation of said second means by said manually operable element.

2. In a welding system of the character described, welding electrodes, a source of alternating current, a voltage step-down transformer having its primary winding coupled to said source, an oscilloscope having beam deflection means, a current limiting resistance, a first relay having a first coil and a first normally closed switch, the secondary winding of said transformer being connected in a series circuit with said resistance and said first switch, said beam deflection means being coupled to said series circuit to produce a display representative of the voltage across said electrodes, a second relay having a second coil and a second normally open switch and a third normally closed switch, a third relay having a third coil and fourth, fifth and sixth normally open switches, a normally open pressure responsive switch closed in response to pressure applied between said electrodes, said pressure responsive switch and said second coil being connected in a series circuit with said source, said first coil and said fourth switch being connected in a series circuit with said source, a manually operable normally open switch, said third coil and said manually operable switch and said third switch being connected in a series circuit with said source, said fifth switch being connected in shunt with said switch, a welding current power supply connected to said electrodes and having a control circuit which includes said second and sixth switches in a series connection in said control circuit.

3. A system as set forth in claim 2 including audible signalling means connected in shunt with said second coil.

4. In a welding control of the character described, welding electrodes, voltage determining means normally coupled to said electrodes and displaying voltage conditions at said electrodes, pressure responsive switch means operated in accordance with pressure exerted between said electrodes, a welding power supply coupled to said electrodes and having a control circuit, a manually operable switch, first relay means operated by said pressure responsive means and incorporating means for conditioning said control circuit, second relay means operated in accordance with the condition of said first relay means and by said manually operable switch, said second relay means incorporating means for rendering said voltage determining means ineffective, said second relay means also incorporating means for conditioning said control circuit, and said second relay means also incorporating means for maintaining itself energized regardless of the condition of said first relay means.

5. A system as set forth in claim 4 including audible indicating means connected in shunt with the coil of said first relay means.

6. In a welding control of the character described, welding electrodes, voltage determining means normally coupled to said electrodes and displaying voltage conditions at said electrodes, pressure responsive switch means operated in accordance with pressure exerted between said electrodes, a welding power supply coupled to said electrodes and normally ineffective to supply power to said electrodes, first and second relay means each having two different states of operation, said pressure responsive switch means when operated being effective to change said first relay means from its first state to its second state, manually operated switch means when manually operated being effective to change said second relay means from its first state to its second state but only when said first relay means is in its first state, said second relay means after being operated to its second state being effective to maintain itself in said second state so long as said manually operated switch means is manually operated, said second relay means when in its second state being effective to disable said voltage determining means, and said first and said second relay means when each simultaneously is in its second state being effective to render said power supply effective to supply welding current to said electrodes.

7. A system as set forth in claim 6 in which audible indicating means is rendered effective upon operation of said pressure responsive switch means.

8. In a welding system of the character described, welding electrodes, first means for indicating electrical resistance between said electrodes, a pressure responsive element, second means for applying a welding current between said electrodes and for disabling said first means, said second means incorporating said pressure responsive element and a manually operable element normally effective when operated to render said second means effective to supply welding current to said electrodes and to disable said first means, and means operated in response to actuation of said pressure responsive element for preventing operation of said second means by said manually operable element.

9. In the process of welding two articles together using welding electrodes connectable to a welding current supply, applying a pressure between said electrodes with said articles being disposed therebetween while said electrodes are disconnected from said supply, monitoring said pressure applied between said electrodes, monitoring the electrical resistance between said electrodes when and as said pressure is being applied between said electrodes, and connecting said supply to said electrodes only when said pressure and said resistance are each of predetermined magnitude.

10. The process as set forth in claim 9 including the step of discontinuing said monitoring when said supply is connected to said electrodes and resuming said monitoring of said resistance after said current supply is subsequently disconnected from said electrodes.

11. In a system of the character described in which two articles are welded together using pressure applied between welding electrodes connectable to a welding current supply, the improvement which resides in continuously monitoring both the pressure and electrical resistance between said electrodes and connecting said supply to said electrodes only when said pressure and resistance are each of a predetermined magnitude.

12. In a system of the character described wherein two articles are welded together using pressure applied between said electrodes with said articles being disposed therebetween, means for monitoring the electrical resistance between said electrodes, means responsive to pressure applied between said electrodes for developing a condition, a current supply for said electrodes, manually operated means subject to said condition for connecting said current supply to said electrodes, and means effective only when said current supply is connected to said electrodes for disabling said monitoring means.

References Cited

UNITED STATES PATENTS

| | | | |
|---|---|---|---|
| 1,933,936 | 11/1933 | Schnetzer | 219—110 |
| 1,975,997 | 10/1934 | Whitesell | 219—109 X |
| 2,112,716 | 3/1938 | Smith | 219—110 |
| 2,371,636 | 3/1945 | McConnell | 219—109 X |
| 2,460,759 | 2/1949 | Martin et al. | 219—89 |
| 3,149,221 | 9/1964 | Watter et al. | 219—110 |

RICHARD M. WOOD, *Primary Examiner.*

B. A. STEIN, *Assistant Examiner.*